(12) United States Patent
Yang et al.

(10) Patent No.: US 9,304,650 B2
(45) Date of Patent: Apr. 5, 2016

(54) AUTOMATIC CURSOR ROTATION

(71) Applicant: Acer Incorporated, New Taipei (TW)

(72) Inventors: Tsung-Hang Yang, New Taipei (TW);
Yu-Hsuan Shen, New Taipei (TW);
Yi-Wen Liu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 100 days.

(21) Appl. No.: 14/143,037

(22) Filed: Dec. 30, 2013

(65) Prior Publication Data

US 2014/0240232 A1 Aug. 28, 2014

(30) Foreign Application Priority Data

Feb. 23, 2013 (TW) .............................. 102106419 A (51) Int. Cl.
*G06F 3/0481* (2013.01)
*G06F 3/0488* (2013.01)

(52) U.S. Cl.
CPC .......... *G06F 3/04812* (2013.01); *G06F 3/0488* (2013.01); *G06F 3/04886* (2013.01)

(58) Field of Classification Search
None
See application file for complete search history.

(56) References Cited

U.S. PATENT DOCUMENTS 6,157,367 A * 12/2000 Van Der Haar et al. ...... 715/856
D706,826 S * 6/2014 McLean ....................... D14/491

* cited by examiner

*Primary Examiner* — David D Davis
(74) *Attorney, Agent, or Firm* — Edell, Shapiro & Finnan, LLC (57) ABSTRACT

A method for displaying of a touch cursor is provided. The method is adapted to an electronic apparatus having a touch display unit. The touch display unit has a display area. The method includes the following steps. At least one first dimension boundary and at least one second dimension boundary are defined in the display area. A cursor, which has a pointing area and a touchable area, is displayed. When a touch event occurs in the touchable area, the cursor is correspondingly moved according to a touch coordinate of the touch event. When a reference point of the cursor passes two of the at least one first dimension boundary or two of the at least one second dimension boundary, the cursor is rotated for adjusting a relative position of the pointing area and the touchable area.

20 Claims, 10 Drawing Sheets

AUTOMATIC CURSOR ROTATION

RELATED APPLICATION DATA

This application claims priority under 35 U.S.C 119 to Taiwan patent application, TW 102106419, filed on Feb. 23, 2013, the disclosure of which is incorporated herein by reference.

TECHNICAL FIELD

Background

Touch sensors or touch panels have become a popular type of user interface and are used in many types of electronic devices, such as mobile phones, personal digital assistants (PDAs), navigation devices, video games, computers (e.g., tablets), etc., collectively referred to herein as touch devices. Touch devices recognize a touch input of a user and obtain the location of the touch to effect a selected operation.

A touch panel may be positioned in front of a display screen such as a liquid crystal display (LCD), or may be integrated with a display screen. Such configurations, referred to as touch screens, allow the user to intuitively connect a pressure point of the touch panel with a corresponding point on the display screen, thereby creating an active connection with the screen. In general, a finger or stylus is used to interact with the touch screen to, for example, select various displayed objects (e.g., icons, menus, etc.). In certain cases, a displayed object may be small, thereby making it difficult for users to quickly or accurately select the displayed object.

SUMMARY

In accordance with certain embodiments presented herein, a touch device is configured to display a touch activated cursor that enhances a user's ability to select objects on the touch screen. The touch device is configured to automatically rotate the cursor depending on movement of the cursor on the touch screen. More specifically, the touch device defines at least one transition region on the touch screen bounded by first and second rotational boundaries. The touch device is configured to detect movement of the cursor in to and out of the transition region. The touch device is also configured to determine, based on the movement of the cursor in to and out of the transition region, whether the cursor should be rotated from a first orientation to a second orientation.

BRIEF DESCRIPTION OF THE DRAWINGS

Embodiments are described herein in conjunction with the accompanying drawings, in which.

DESCRIPTION OF EXAMPLE EMBODIMENTS

Figure 1:
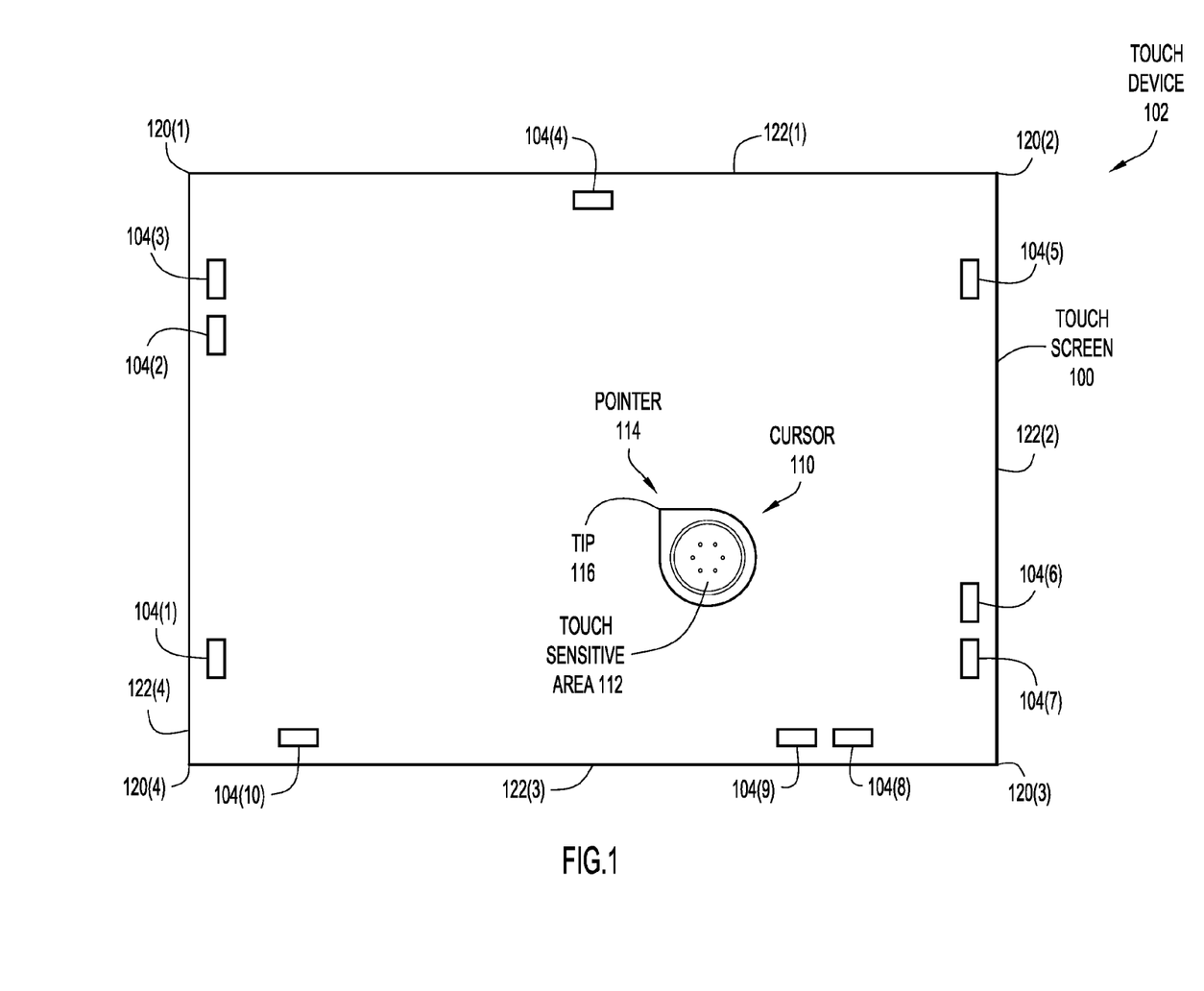
FIG. 1 is a schematic diagram of a touch device configured to display a touch activated cursor.

FIG. 1 is a schematic diagram of a touch screen 100 of a touch device 102 configured to display a touch activated cursor. The touch device 102 may be, for example, a tablet computing device, mobile phone, personal digital assistant (PDA), desktop computer, navigation device, laptop computer, or any other device that includes a touch screen.

Touch screen 100 comprises a touch sensor/panel that is positioned on front of, or integrated with, a display screen. Touch screen 100 is configured to recognize touch inputs of a user and determine the location of the touch input. The touch screen 100 connects a pressure point of the touch panel with a corresponding point on the display screen, thereby providing the user with an intuitive connection with the screen. The touch input may be, for example, physical contact via a finger, a stylus, etc. It is to be appreciated that the touch device 102 may also include other types of user interfaces, such as, for example, a keyboard, a mouse, a trackpad, etc. These alternative user interfaces have, for ease of illustration, been omitted from FIG. 1.

As shown, the touch screen 100 has corners 120(1), 120(2), 120(3), and 120(4). A first edge 122(1) of the touch screen 100 extends between the first corner 120(1) and the second corner 120(2), while a second edge 122(2) of the touch screen 100 extends between the second corner 120(2) and the third corner 120(3). A third edge 122(3) of the touch screen 100 extends between the third corner 120(3) and the fourth corner 120(4), while a fourth edge 122(4) of the touch screen 100 extends between the fourth corner 120(4) and the first corner 120(1). The touch screen 100 may have a generally square shape where all edges 122(1)-122(4) are the same length or a generally rectangular shape where two parallel edges (e.g., edges 122(1) and 122(3) or edges 122(2) and 122(4)) are longer than the other two edges.

The touch screen 100 is configured to display a plurality of user interface (UI) elements or objects 104(1)-104(10). The displayed objects 104(1)-104(10) may comprise, for example, icons, menus, tools/toolbars, panels, documents, etc. In certain embodiments, the displayed objects 104(1)-104(10) may be small in size, thereby making it difficult for users to quickly or accurately select the displayed objects. As such, the touch device 102 is configured to display a touch activated cursor (touch cursor) 110 on the touch screen 100 that enhances a user's ability to select displayed objects. The cursor 110 may be initially displayed on the touch screen 100 by, for example, accessing a tool menu.

The cursor 110 comprises a touch sensitive area 112 and a pointer 114. The pointer 114 terminates in a fine tip (point) 116. Using the cursor 110, a user can select, drag or tap on small objects 104(1)-104(10) that may be difficult to select with a fingertip. More specifically, a user can place a fingertip on the touch sensitive area 112 and drag the cursor 110 to different points on the touch screen 100. In general, the cursor 110 can be dragged in any direction until the touch sensitive area 112 reaches an edge of the touch screen 100. Since it is the user's touch at the touch sensitive area 112 that controls the movement of the cursor 110, once the touch sensitive area 112 reaches an edge of the touch screen 100, the cursor can not be moved any further in that direction (i.e., the touch sensitive area 112 cannot be moved and/or controlled outside of the area of the touch screen 100).

Through touches at the touch sensitive area 112, the cursor 100 also enables a user to perform all standard touch screen commands including tap, double-tap, drag, and drag-select, etc. For example, to select an item on the screen, such as displayed object 104(2), the touch sensitive area 112 is used to position the tip 116 of pointer 114 over the object 104(2). The user may then tap or double-tap the touch sensitive area 112, causing the object 104(2) (i.e., the item positioned underneath the tip 116) to be selected.

Additionally, to drag an item, such as displayed object 104(2), across the touch screen 100, the touch sensitive area 112 is used to position tip 116 of pointer 114 over the displayed object 104(2). The user may then press briefly on the touch sensitive area 112 to activate a drag mode during which the displayed object 104(2) can be dragged to a new location. When the displayed object 104(2) is at a new position, the user may then again briefly press the touch sensitive area 112 to deactivate the drag mode and release control over the displayed object 104(2) (i.e., cause the displayed object to remain at the new location).

As noted above, the cursor 110 enables a user to perform all standard touch screen commands (e.g., activation of menus/displays, text editing, etc.) through one or more touches at the touch sensitive area 112. In general, since the tip 116 of pointer 114 has a size/shape that is smaller than a typical user's fingertip, the pointer 116 enables greater granularity and selectability in comparison to a fingertip touch. That is, the cursor 110 provides a user with precise pointing control on the touch screen 100 in situations where it may be difficult to do so using only a fingertip. The fine tip 116 allows a user to work with even very small screen elements which may be particularly helpful when using operating system setting and configuration windows with small buttons, boxes or other small items.

As shown in FIG. 1, the cursor 110 may have a default orientation where the tip 116 of pointer 114 points towards the first corner 120(1) of the touch screen. In this orientation, the user has the ability to select displayed objects positioned along edges 122(4) (i.e., objects 104(1)-104(3)) and 122(1) (i.e., object 104(4)). That is, a user can move the cursor 110 so as to position the tip 116 over those displayed objects 104(1)-104(4). However, the user cannot select displayed objects positioned along edges 122(2) (i.e., objects 104(5), 104(6), and 104(7)) and 122(3) (i.e., objects 104(8), 104(9), and 104(10)).

Figure 2A:
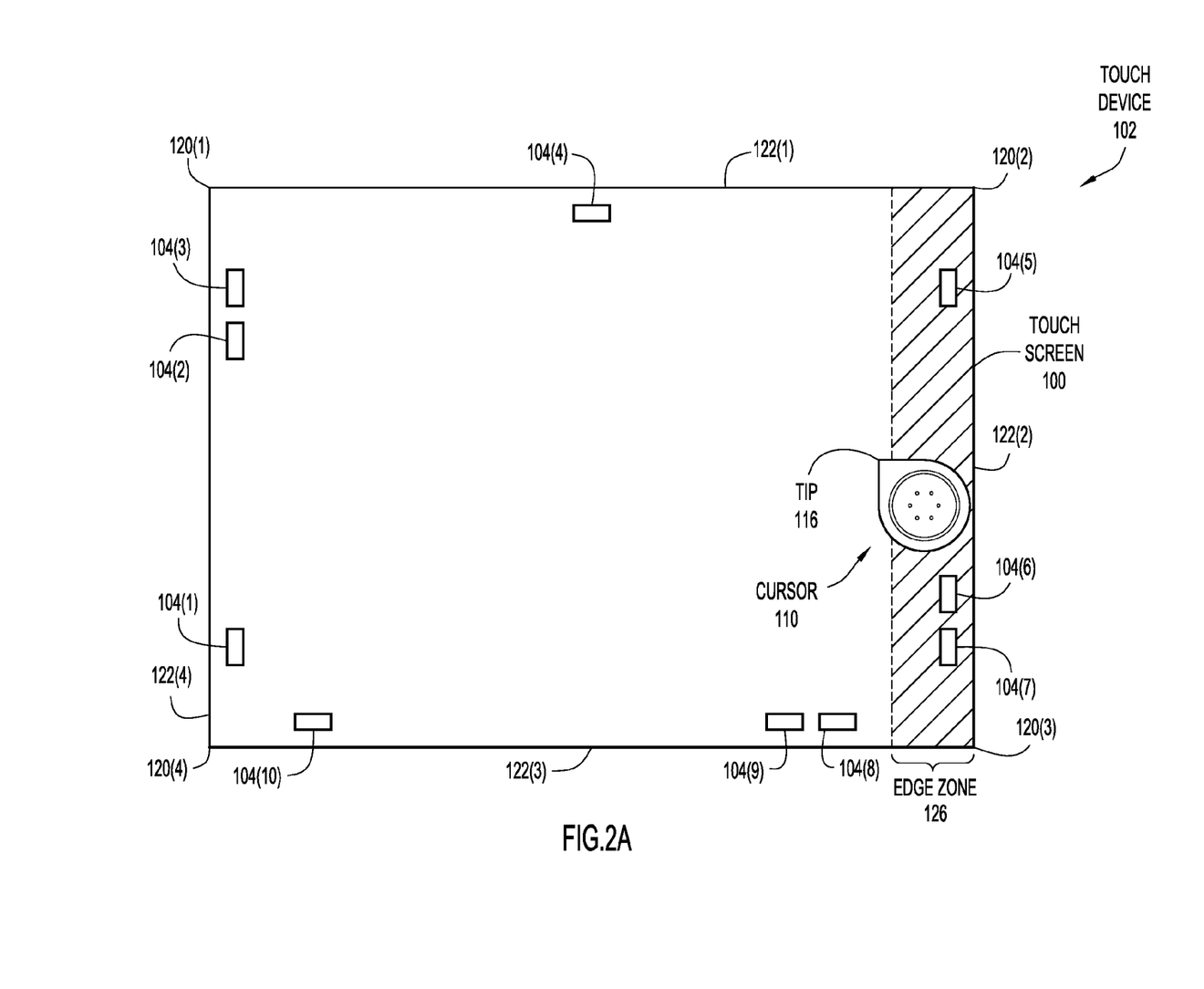
FIGS. 2A and 2B are schematic diagrams of a touch device during display of a touch activated cursor.
Figure 2B:
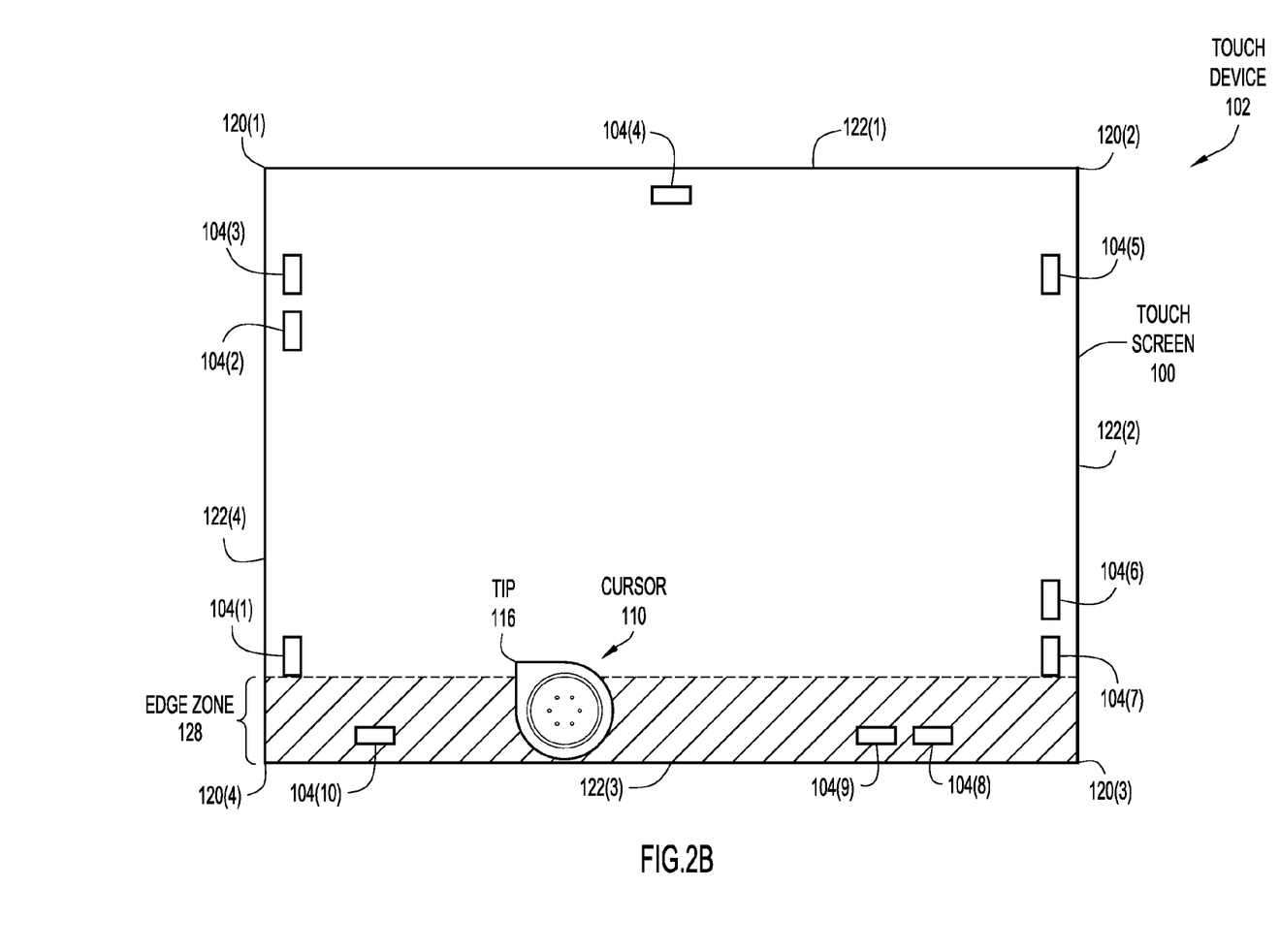

More specifically, as shown in FIG. 2A, when the cursor 110 is moved as close as possible to edge 122(2) (i.e., such that the cursor 110 abuts the edge 122(2)), the tip 116 is positioned outside of an edge zone 126 in which the objects 104(5)-104(7) are positioned. That is, the size and orientation of cursor 110 prevents the tip 116 from being positioned sufficiently close to edge 122(2) to select objects 104(5)-104 (7) (or any other items in edge zone 126). Similarly, as shown in FIG. 2B, when the cursor 110 is moved as close as possible to edge 122(3) (i.e., such that the cursor 110 abuts the edge 122(3)), the tip 116 is positioned outside of an edge zone 128 in which the objects 104(8)-104(10) are positioned. That is, the size and orientation of cursor 110 prevents the tip 116 from being positioned sufficiently close to edge 122(3) to select objects 104(8)-104(10) (or any other items in edge zone 128). Accordingly, in the arrangements of FIGS. 2A and 2B, the objects along edges 122(2) and 122(3) are only selectable when the cursor 110 is not used (i.e., via a direct fingertip touch).

Presented herein are techniques that enable a touch device to automatically rotate a displayed touch activated cursor, where the automatic rotation depends on the movement of the cursor. More specifically, the techniques presented herein create one or more transition regions on the touch screen that are bounded by rotational boundaries. The touch device is configured to automatically rotate the cursor depending on the direction of movement of the cursor into and out of the transition region. For ease of illustration, the automatic cursor rotation techniques will be described with reference to the touch device 102 having the touch screen 100 as described above.

Figure 3A:
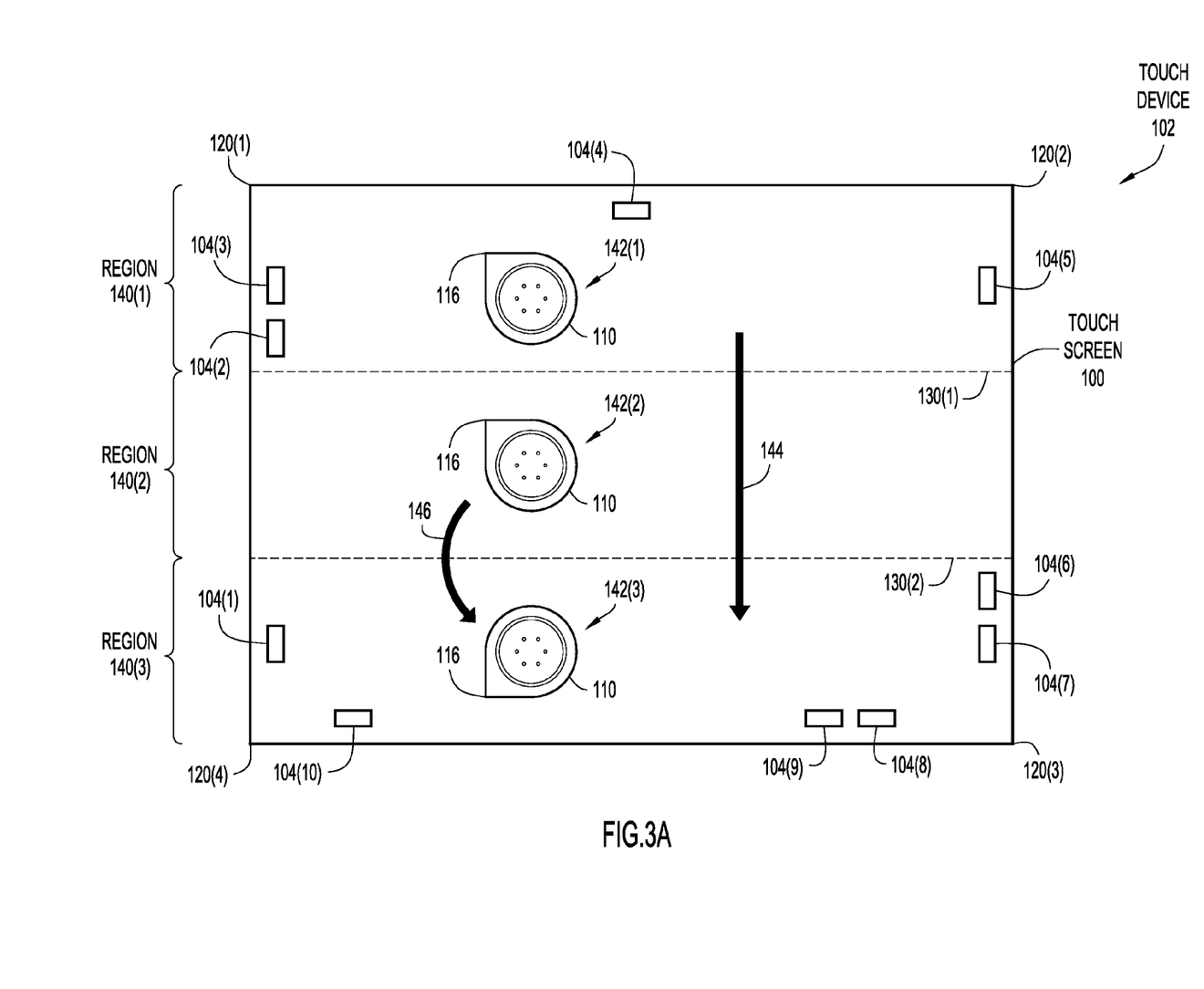
FIGS. 3A and 3B are schematic diagrams of a touch device configured to implement automatic cursor rotation techniques in accordance with embodiments presented herein.
Figure 3B:
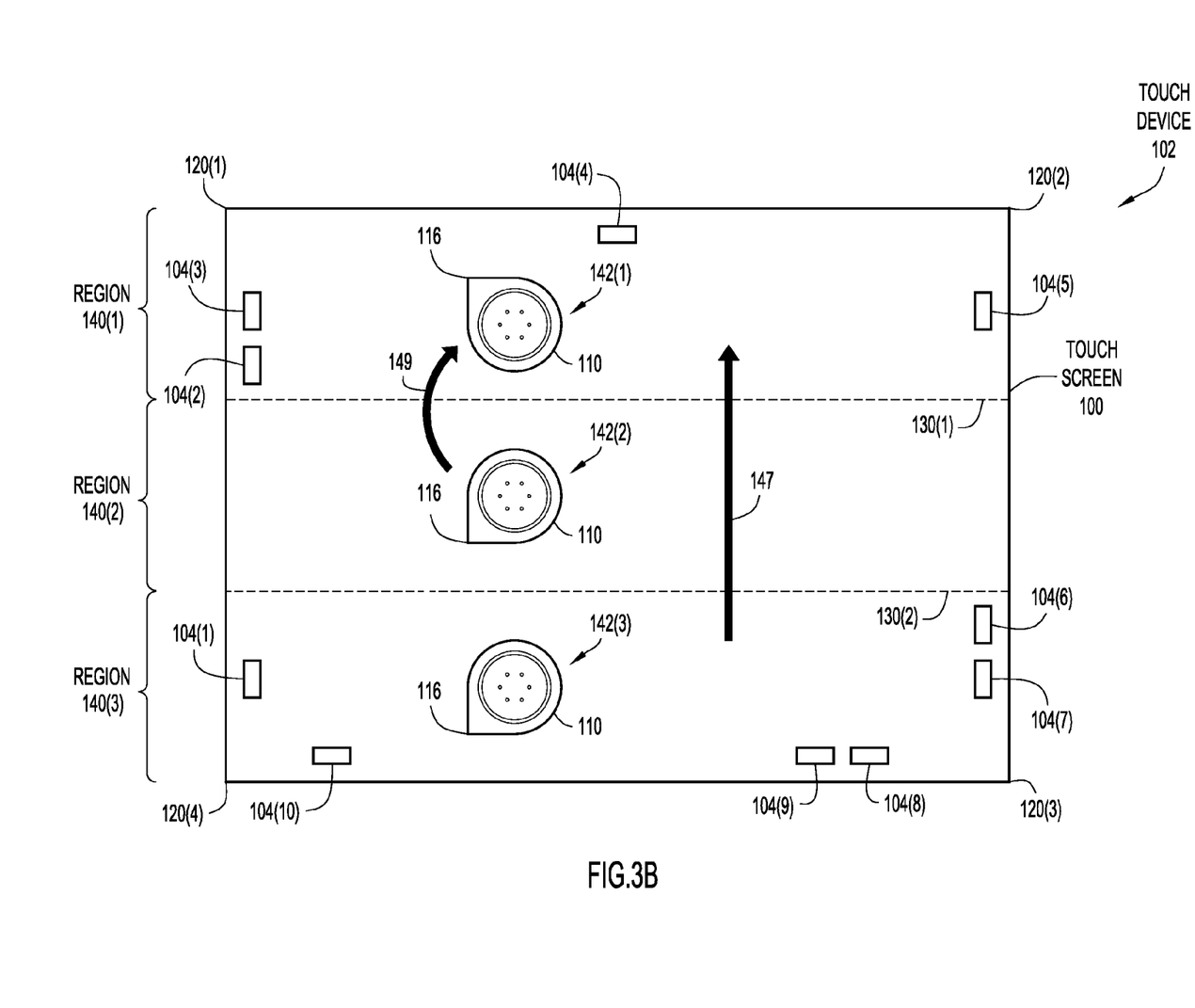

FIGS. 3A and 3B are schematic diagrams illustrating touch screen 100 during a first automatic cursor rotation technique in accordance with embodiments presented. As shown, the touch screen 100 includes two longitudinal rotational boundaries 130(1) and 130(2) that functionally divide the touch screen 100 into three longitudinal regions, namely a first longitudinal region 140(1), a second longitudinal region 140 (2), and a third longitudinal region 140(3). As described further below, the second longitudinal region 140(2), which is bounded by the rotational boundaries 130(1) and 130(2), forms a transition region. In practice, the longitudinal rotational boundaries 130(1) and 130(2) are defined to correspond to locations on the screen, but generally are not visible on touch screen 100. As such, longitudinal rotational boundaries 130(1) and 130(2) are shown in FIGS. 3A and 3B merely for purposes of illustration.

Referring specifically to FIG. 3A, three instances of cursor 100 are shown at different positions on the touch screen 100. More particularly, cursor 100 is shown at a first position 142(1) within region 140(1), at a second position 142(2) within transition region 140(2), and at a third position 142(3) within region 140(3). It is to be appreciated that the three instances of cursor 100 are shown merely for purposes of illustration and collectively reflect movement of cursor 100 in direction of arrow 144 (i.e., from region 140(1) to 140(3)) over a period of time. In operation, only one instance of the cursor 110 would appear on touch screen 100 at any given time.

The cursor 110 is first located at position 142(1) (within region 140(1)) and the cursor has a first orientation where the tip 116 points in the general direction of corner 120(1). The user moves the cursor 110 to position 142(2) such that the cursor 110 crosses the rotational boundary 130(1) and moves into transition region 140(2). The touch device 102 is configured such that when the cursor 110 crosses into transition region 140(2), the orientation of the cursor does not change. In the case of FIG. 3A, the cursor 110 is maintained in the orientation in which tip 116 points in the general direction of corner 120(1).

The user further moves the cursor 110 from the second position 142(2) (within transition region 140(2)) to position 142(3) (within region 140(3)). During this movement, the cursor 110 crosses the rotational boundary 130(2). When the cursor 110 exits the transition region 140(2), the touch device 102 is configured to determine whether the cursor should be rotated to a new orientation. The determination of whether the cursor 110 should be rotated depends on the movement of the cursor 110 out of the transition region (i.e., which rotational boundary is crossed as the cursor 110 exits the transition region 140(2)).

More specifically, when the cursor 110 crosses a rotational boundary upon exit from the transition region 140(2) that is different from the rotational boundary that was crossed when the cursor 110 entered the transition region, the touch device 100 is configured to automatically rotate the cursor 110 to a different orientation. In the embodiment of FIG. 3A, the cursor 110 exits the transition region 140(2) by crossing the rotational boundary 130(2), which is different from the rotational boundary 130(1) that was crossed as the cursor 110 entered the transition region 140(2). As such, the touch device 102 is configured to rotate the cursor 110 such that the tip 116 of the cursor 110 points in the general direction of corner 120(4). The rotation of cursor 110 is illustrated in FIG. 3A by arrow 146.

FIG. 3B illustrates movement of cursor 110 that is opposite from that shown in FIG. 3A, namely movement from position 142(3) to position 142(1). This movement is generally represented in FIG. 3B by arrow 147. At position 142(3), the tip 116 of cursor 110 points in the general direction of corner 120(4).

In FIG. 3B, the user moves the cursor 110 to position 142(2) within transition region 140(2) so that the cursor 110 crosses the rotational boundary 130(2). As noted above, the touch device 102 is configured such that when the cursor 110 crosses a first rotational boundary during entry into the transition region 140(2), the orientation of the cursor does not change. As such, during the movement from position 142(3) to position 142(2), the touch device 102 does not rotate the cursor 110 to change the direction of tip 116.

As shown in FIG. 3B, the user further moves the cursor 110 from the second position 142(2) (within transition region 140(2)) to position 142(1) (within region 140(1)). During this movement, the cursor 110 crosses the rotational boundary 130(1). As noted above, the touch device 102 is configured such that when the cursor 110 crosses a rotational boundary upon exiting the transition region 140(2), the touch device 102 determines whether the cursor should be rotated to a new orientation. The determination of whether the cursor 110 should be rotated depends on the movement of the cursor 110 out of the transition region (i.e., which rotational boundary is crossed as the cursor 110 exits the transition region 140(2)). In the embodiment of FIG. 3B, the cursor 110 exits the transition region 140(2) by crossing the rotational boundary 130 (1), which is different from the rotational boundary 130(2) that was crossed as the cursor 110 entered the transition region 140(2). As such, the touch device 102 is configured to rotate the cursor 110 such that the tip 116 of the cursor 110 points in the general direction of corner 120(1). The rotation of cursor 110 is illustrated in FIG. 3B by arrow 149.

In summary, FIGS. 3A and 3B illustrate two longitudinal rotational boundaries that define a longitudinal transition region that is used to control the orientation of a displayed touch cursor 110. As noted, the touch device 102 may automatically rotate the orientation of cursor 110 as the cursor exits the transition region. The determination of whether the cursor should be rotated depends on the direction of movement of the cursor relative to the rotational boundaries that are crossed as the cursor entered and exited the transition region.

Figure 4A:
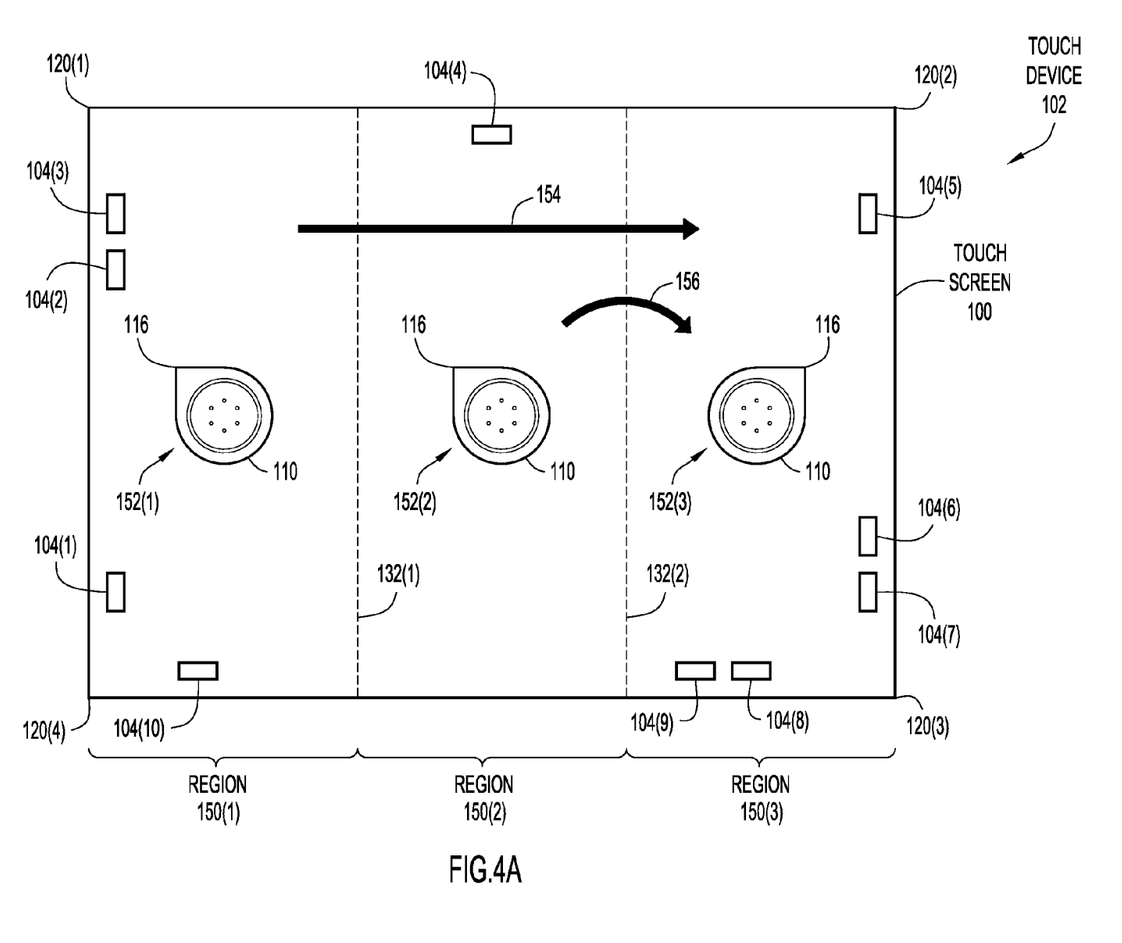
FIGS. 4A and 4B are schematic diagrams of a touch device configured to implement automatic cursor rotation techniques in accordance with embodiments presented herein.
Figure 4B:
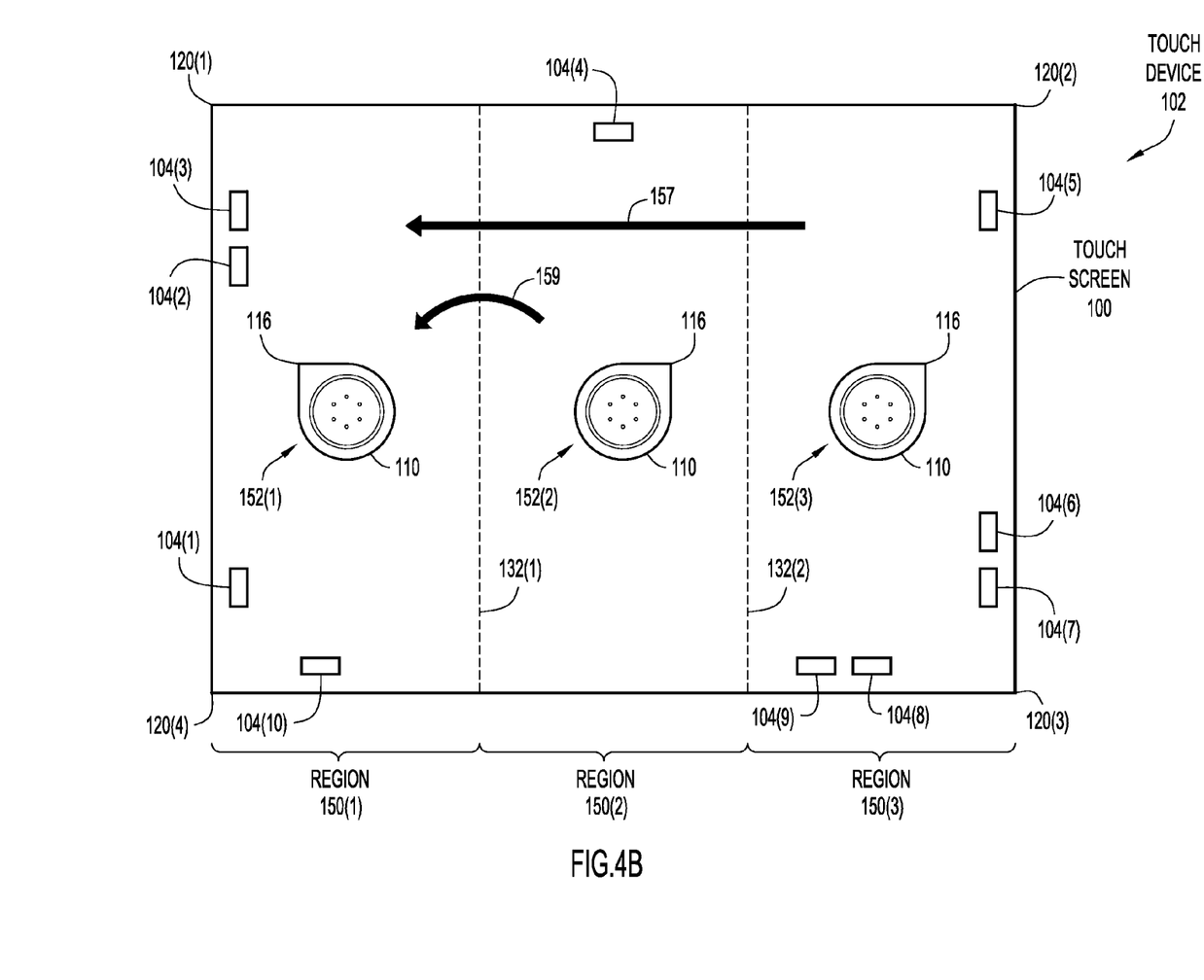

FIGS. 4A and 4B are schematic diagrams illustrating touch screen 100 during a second automatic cursor rotation technique in accordance with embodiments presented. As shown, the touch screen 100 includes two transverse rotational boundaries 132(1) and 132(2) that functionally divide the touch screen 100 into three transverse regions, namely a first transverse region 150(1), a second transverse region 150(2), and a third transverse region 150(3). As described further below, the second transverse region 150(2), which is bounded by the rotational boundaries 132(1) and 132(2), forms a transition region. In practice, the longitudinal rotational boundaries 132(1) and 132(2) are defined to correspond to locations on the screen, but generally are not visible on touch screen 100. As such, transverse rotational boundaries 132(1) and 132(2) are shown in FIGS. 4A and 4B merely for purposes of illustration.

Referring specifically to FIG. 4A, three instances of cursor 100 are shown at different positions on the touch screen 100. More particularly, cursor 100 is shown at a first position 152(1) within region 150(1), at a second position 152(2) within transition region 150(2), and at a third position 152(3) within region 150(3). It is to be appreciated that the three instances of cursor 100 are shown merely for purposes of illustration and collectively reflect movement of cursor 100 in direction of arrow 154 (i.e., from position 150(1) to 150(3)) over a period of time. In operation, only one instance of the cursor 110 would appear on touch screen 100 at any given time.

The cursor 110 is first located at position 152(1) (within region 150(1)) and the cursor has a first orientation where the tip 116 points in the general direction of corner 120(1). The user moves the cursor 110 to position 152(2) such that the cursor 110 crosses the rotational boundary 132(1) and moves into transition region 150(2). The touch device 102 is configured such that when the cursor 110 crosses into transition region 150(2), the orientation of the cursor does not change. In the case of FIG. 4A, the cursor 110 is maintained in the orientation in which tip 116 points in the general direction of corner 120(1).

The user further moves the cursor 110 from the second position 152(2) (within transition region 150(2)) to position 152(3) (within region 150(3)). During this movement, the cursor 110 crosses the rotational boundary 132(2). When the cursor 110 exits the transition region 150(2), the touch device 102 is configured to determine whether the cursor should be rotated to a new orientation. The determination of whether the cursor 110 should be rotated depends on the movement of the cursor 110 out of the transition region (i.e., which rotational boundary is crossed as the cursor 110 exits the transition region 150(2)).

More specifically, when the cursor 110 crosses a rotational boundary upon exit from the transition region 150(2) that is different from the rotational boundary that was crossed when the cursor 110 entered the transition region, the touch device 100 is configured to automatically rotate the cursor 110 to a different orientation. In the embodiment of FIG. 4A, the cursor 110 exits the transition region 150(2) by crossing the rotational boundary 132(2), which is different from the rotational boundary 132(1) that was crossed as the cursor 110 entered the transition region 150(2). As such, the touch device 102 is configured to rotate the cursor 110 such that the tip 116 of the cursor 110 points in the general direction of corner 120(2). The rotation of cursor 110 is illustrated in FIG. 4A by arrow 156.

FIG. 4B illustrates movement of cursor 110 that is opposite from that shown in FIG. 4A, namely from position 152(3) to position 152(1). This movement is generally represented in FIG. 4B by arrow 157. At position 152(3), the tip 116 of cursor 110 points in the general direction of corner 120(2).

In FIG. 4B, the user moves the cursor 110 to position 152(2) within transition region 150(2) so that the cursor 110 crosses the rotational boundary 132(2). As noted above, the touch device 102 is configured such that when the cursor 110 crosses a first rotational boundary during entry into the transition region 150(2), the orientation of the cursor does not change. As such, during the movement from position 152(3) to position 152(2), the touch device 102 does not rotate the cursor 110 to change the direction of tip 116.

As shown in FIG. 4B, the user further moves the cursor 110 from the second position 152(2) (within transition region 150(2)) to position 152(1) (within region 150(1)). During this movement, the cursor 110 crosses the rotational boundary 132(1). As noted above, the touch device 102 is configured such that when the cursor 110 crosses a rotational boundary upon exiting the transition region 150(2), the touch device 102 determines whether the cursor should be rotated to a new orientation. The determination of whether the cursor 110 should be rotated depends on the movement of the cursor 110 out of the transition region (i.e., which rotational boundary is crossed as the cursor 110 exits the transition region 150(2)). In the embodiment of FIG. 4B, the cursor 110 exits the transition region 150(2) by crossing the rotational boundary 132(1), which is different from the rotational boundary 132(2) that was crossed as the cursor 110 entered the transition region 150(2). As such, the touch device 102 is configured to rotate the cursor 110 such that the tip 116 of the cursor 110 points in the general direction of corner 120(1). The rotation of cursor 110 is illustrated in FIG. 4B by arrow 159.

In summary, FIGS. 4A and 4B illustrate two transverse rotational boundaries that define a transverse transition region that is used to control the orientation of a displayed touch cursor 110. As noted, the touch device 102 may automatically rotate the orientation of cursor 110 as the cursor exits the transition region. The determination of whether the cursor should be rotated depends on the direction of movement of the cursor relative to the rotational boundaries that are crossed as the cursor entered and exited the transition region.

Figure 5:
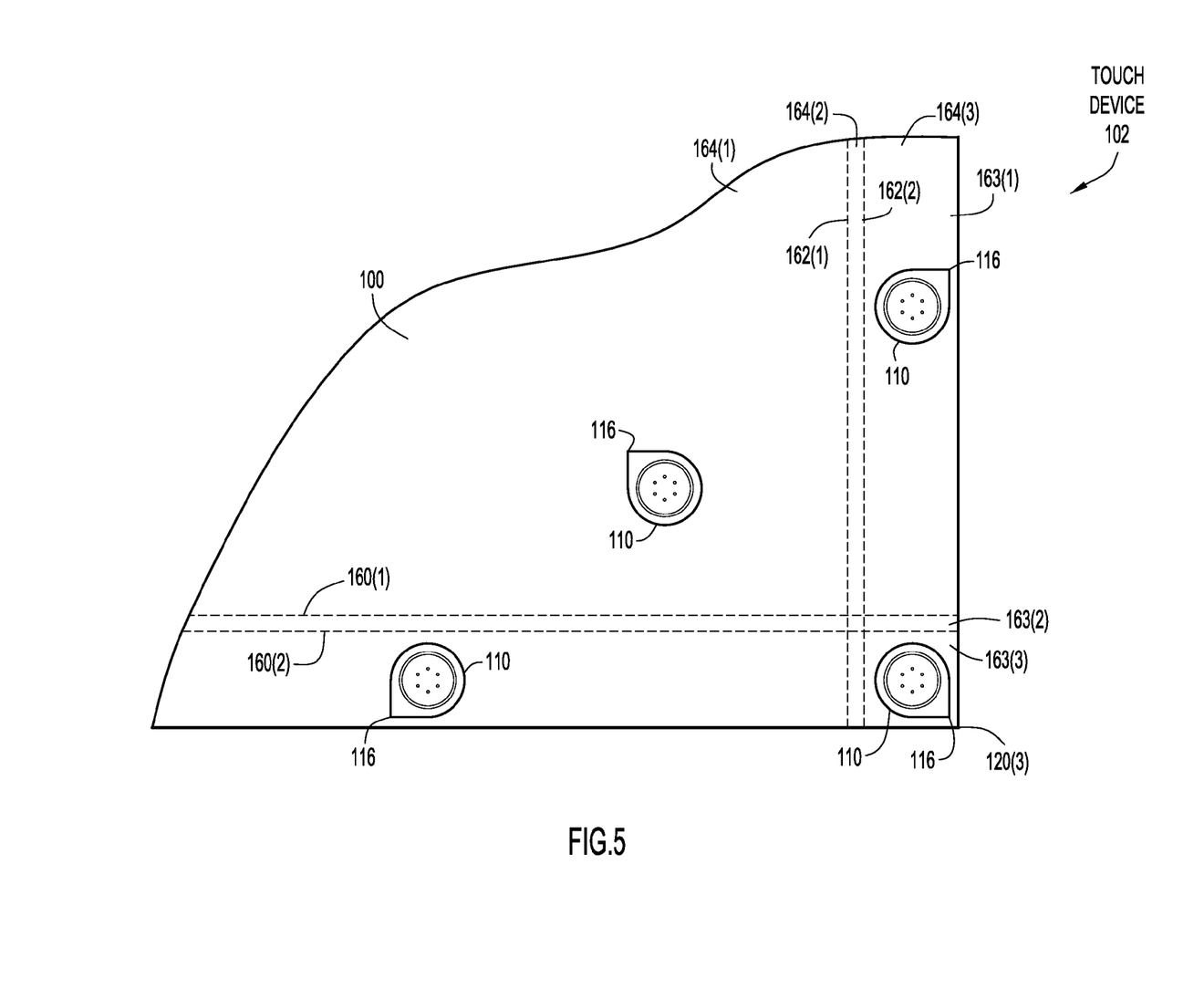
FIG. 5 is a schematic diagram of a touch device configured to implement automatic cursor rotation techniques in accordance with embodiments presented herein.

FIG. 5 illustrates a portion of touch screen 100 that is near corner 120(3) in an embodiment that includes two longitudinal rotational boundaries 160(1) and 160(2) and two transverse boundaries 162(1) and 162(2) (i.e., four rotational boundaries). The longitudinal rotational boundaries 160(1) and 160(2) functionally divide the touch screen 100 in three longitudinal regions 163(1), 163(2), and 163(3). The transverse rotational boundaries 162(1) and 163(2) functionally divide the touch screen 100 in three longitudinal regions 164(1), 164(2), and 164(3).

In the embodiment of FIG. 5, the longitudinal boundaries and transverse boundaries collectively enable the cursor 110 to have any of four different orientations. More specifically, when the cursor 110 is in longitudinal region 163(1) while also in transverse region 164(1), tip 116 of cursor 110 points in the general direction of corner 120(1) (upper left corner, not shown in FIG. 5). When the cursor 110 is in longitudinal region 163(1) while also in transverse region 164(3), the tip 116 of cursor 110 points in the general direction of corner 120(2) (upper right corner, not shown in FIG. 5). When the cursor 110 is in longitudinal region 163(3) while also in transverse region 164(1), tip 116 of cursor 110 points in the general direction of corner 120(4) (lower left corner, not shown in FIG. 5). When the cursor 110 is in longitudinal region 163(3) while also in transverse region 164(3), tip 116 of cursor 110 points in the general direction of corner 120(3).

In FIG. 5, the regions 163(2) and 164(2) operate as transition regions in which the orientation of cursor 110 does not change. More specifically, the orientation of cursor 110 does not change as it crosses a first rotational boundary to enter a transition region 163(2) or 164(2). However, the orientation of cursor 110 does change if the cursor 110 is moved out of the transition region 163(2) or 164(2) across the second corresponding rotational boundary. For example, if cursor 110 is moved from region 164(1) into region 164(2), the cursor 110 crosses transverse rotational boundary 162(1) as it enters region 164(2) and the touch device 102 does not change the orientation of the cursor. If cursor 110 is moved out of region 164(2) back into region 164(1) (i.e., re-crosses transverse rotational boundary 162(1)), the touch device 102 again does not change the orientation of the cursor 110. However, if cursor 110 is moved out of region 164(2) into region 164(3) (i.e., crosses transverse rotational boundary 162(2)), the touch device 102 changes the orientation of the cursor 110 so that the tip 116 generally points in the direction of corner 120(2). This operation continues for opposite movement within transition region 164(2) (i.e., movement from region 164(3) to region 164(1)) and movement in/out of transition region 163(2).

In summary, FIG. 5 illustrates the use of two transverse rotational boundaries and two longitudinal boundaries that define transverse and longitudinal transition regions, respectively, that are used to control the orientation of cursor 110. The touch device 102 may automatically rotate the orientation of cursor 110 as the cursor exits a transition region. The determination of whether the cursor should be rotated depends on the direction of movement of the cursor relative to the rotational boundaries that where crossed as the cursor entered and exited the transition region.

Figure 6:
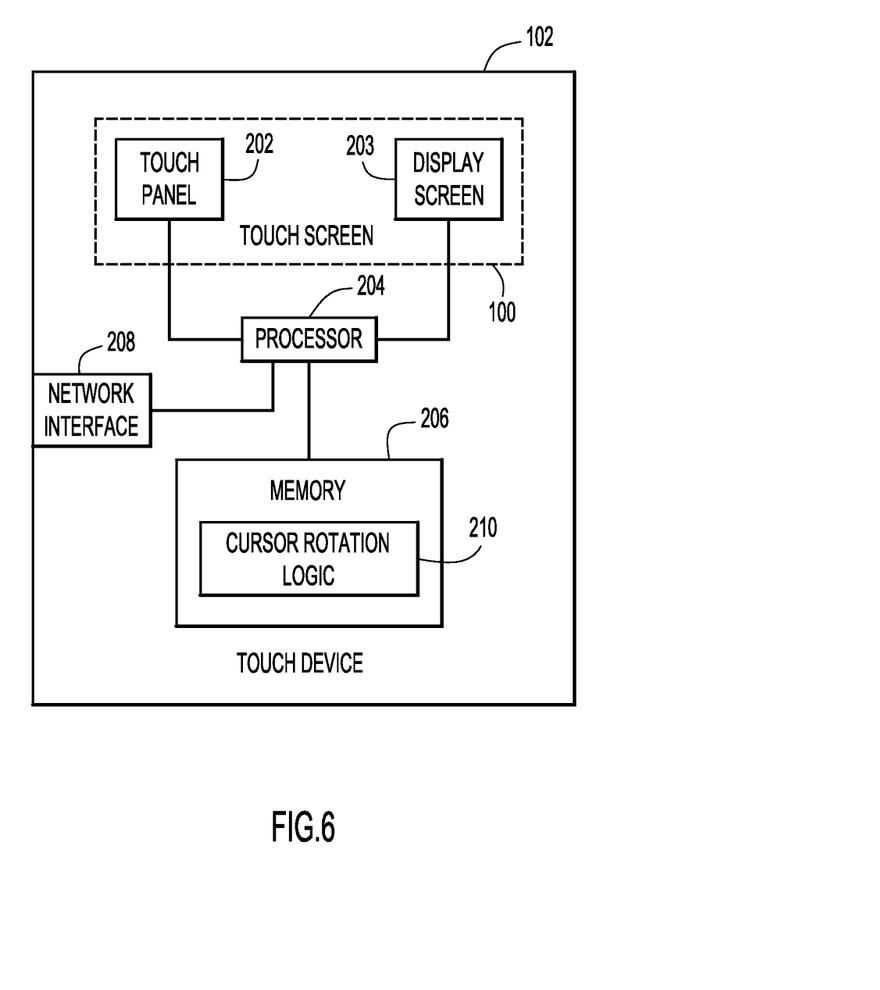
FIG. 6 is a block diagram of a touch device configured to implement automatic cursor techniques in accordance with embodiments presented herein.

Reference is now made to FIG. 6 that shows a block diagram of the touch device 102. The touch device 102 comprises, among other features, a touch screen 100 that includes a touch sensor (panel) 202 that is positioned on front of, or integrated with, a display screen 203. The touch device 102 also comprises a processor 204, a memory 206, and a network interface 208. The touch panel 202, display screen 203, memory 206, and network interface 208 are coupled to the processor 204.

The display screen 203 is configured to display a touch activated cursor (as described above) and the touch panel 202 is configured to receive one or more touch inputs from the user of the touch device 102 that control the cursor. The touch panel 202 and the display screen 203 may be implemented as an integrated unit.

The processor 204 is a microprocessor or microcontroller that is configured to execute program logic instructions (i.e., software) for carrying out various operations and tasks described herein. For example, the processor 204 is configured to execute cursor rotation logic 210 that is stored in the memory 206 to perform the automatic cursor rotation operations described herein. More specifically, the processor 204 may execute cursor rotation logic 210 to, for example, define rotational boundaries on the display screen 203 and to automatically rotate the displayed cursor depending on the position and movement of the cursor relative to those boundaries. The memory 206 may comprise read only memory (ROM), random access memory (RAM), magnetic disk storage media devices, optical storage media devices, flash memory devices, electrical, optical or other physical/tangible memory storage devices.

It is to be appreciated that the cursor rotation logic 210 may take any of a variety of forms, so as to be encoded in one or more tangible computer readable memory media or storage device for execution, such as fixed logic or programmable logic (e.g., software/computer instructions executed by a processor). The processor 204 may be an application specific integrated circuit (ASIC) that comprises fixed digital logic, or a combination thereof. For example, the processor 204 may be embodied by digital logic gates in a fixed or programmable digital logic integrated circuit, in which digital logic gates are configured to perform the operations of the cursor rotation logic 210.

Figure 7:
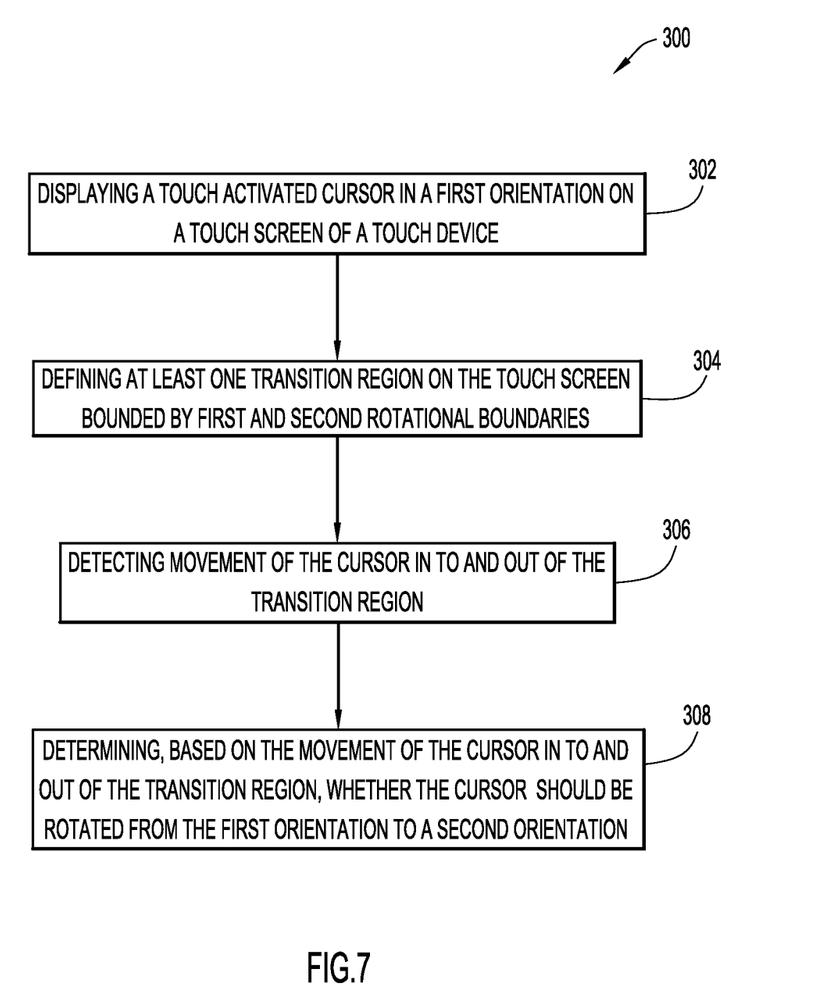
FIG. 7 is a flowchart of a method in accordance with embodiments presented herein.

FIG. 7 is a flowchart of a method 300 in accordance with embodiments presented herein. Method 300 begins at 302 where a touch activated cursor is displayed on a touch screen of a touch device such that cursor has a first orientation. At 304, at least one transition region is defined on the touch screen, where the transition region is bounded by first and second rotational boundaries. At 306, movement of the cursor in to and out of the transition region is detected. At 308, a determination of whether the cursor should be rotated from the first orientation to a second orientation is made based on the movement of the cursor in to and out of the transition region.

In certain embodiments, the method comprises detecting movement of the cursor across the first rotational boundary as the cursor enters the transition region and detecting movement of the cursor across the second rotational boundary as the cursor exits the transition region. In such embodiments, the cursor is automatically rotated from the first orientation to a second orientation, based on the movement of the cursor across the second rotational boundary and out of the transition region.

The above description is intended by way of example only.

What is claimed is:

1. A method, comprising:
   displaying a touch activated cursor in a first orientation on a touch screen of a touch device;
   defining at least one transition region on the touch screen bounded by first and second rotational boundaries;
   detecting movement of the cursor in to and out of the transition region; and
   determining, based on the movement of the cursor in to and out of the transition region, whether the cursor should be rotated from the first orientation to a second orientation.

2. The method of claim 1, further comprising:
   detecting movement of the cursor across the first rotational boundary as the cursor enters the transition region;
   detecting movement of the cursor across the second rotational boundary as the cursor exits the transition region; and
   automatically rotating the cursor from the first orientation to a second orientation, based on the movement of the cursor across the second rotational boundary as the cursor exits the transition region.

3. The method of claim 1, further comprising:
   detecting movement of the cursor across the first rotational boundary as the cursor enters the transition region;
   detecting movement of the cursor across the first rotational boundary as the cursor exits the transition region; and
   maintaining the cursor in the first orientation based on the movement of the cursor across the first rotational boundary as the cursor exits the transition region.

4. The method of claim 1, further comprising:
   maintaining the cursor in the first orientation while in the transition region.

5. The method of claim 1, wherein defining the at least one transition region on the touch screen comprises:
   defining a longitudinal transition region bounded by a first longitudinal rotational boundary and a second longitudinal rotational boundary.

6. The method of claim 5, further comprising:
   defining a transverse transition region bounded by a first transverse rotational boundary and a second transverse rotational boundary.

7. The method of claim 1, wherein defining the at least one transition region on the touch screen comprises:
   defining a transverse transition region bounded by a first transverse rotational boundary and a second transverse rotational boundary.

8. One or more computer readable storage media encoded with software comprising computer executable instructions and when the software is executed operable to:
   display a touch activated cursor in a first orientation on a touch screen of a touch device;
   define at least one transition region on the touch screen bounded by first and second rotational boundaries;
   detect movement of the cursor in to and out of the transition region; and
   determine, based on the movement of the cursor in to and out of the transition region, whether the cursor should be rotated from the first orientation to a second orientation.

9. The computer readable storage media of claim 8, further comprising instructions operable to:
   detect movement of the cursor across the first rotational boundary as the cursor enters the transition region;
   detect movement of the cursor across the second rotational boundary as the cursor exits the transition region; and
   automatically rotate the cursor from the first orientation to a second orientation, based on the movement of the cursor across the second rotational boundary as the cursor exits the transition region.

10. The computer readable storage media of claim 8, further comprising instructions operable to:
    detect movement of the cursor across the first rotational boundary as the cursor enters the transition region;
    detect movement of the cursor across the first rotational boundary as the cursor exits the transition region; and
    maintain the cursor in the first orientation based on the movement of the cursor across the first rotational boundary as the cursor exits the transition region.

11. The computer readable storage media of claim 8, further comprising instructions operable to:
    maintain the cursor in the first orientation while in the transition region.

12. The computer readable storage media of claim 8, wherein the instructions operable to define the at least one transition region on the touch screen comprise instructions operable to:
    define a longitudinal transition region bounded by a first longitudinal rotational boundary and a second longitudinal rotational boundary.

13. The computer readable storage media of claim 12, further comprising instructions operable to:
    define a transverse transition region bounded by a first transverse rotational boundary and a second transverse rotational boundary.

14. The computer readable storage media of claim 13, wherein the instructions operable to define the at least one transition region on the touch screen comprise instructions operable to:
    define a transverse transition region bounded by a first transverse rotational boundary and a second transverse rotational boundary.

15. An apparatus, comprising:
    a memory;
    a touch screen comprising a touch panel and a display screen; and
    a processor configured to:
       display a touch activated cursor in a first orientation on the display screen,
       define at least one transition region on display screen bounded by first and second rotational boundaries,
       detect movement of the cursor in to and out of the transition region in response to touch inputs at the touch panel,
       determine, based on the movement of the cursor in to and out of the transition region, whether the cursor should be rotated from the first orientation to a second orientation.

16. The apparatus of claim 15, wherein the processor is further configured to:
   detect movement of the cursor across the first rotational boundary as the cursor enters the transition region;
   detect movement of the cursor across the second rotational boundary as the cursor exits the transition region; and
   automatically rotate the cursor from the first orientation to a second orientation, based on the movement of the cursor across the second rotational boundary as the cursor exits the transition region.

17. The apparatus of claim 15, wherein the processor is further configured to:
   maintain the cursor in the first orientation while in the transition region.

18. The apparatus of claim 15, wherein to define the at least one transition region on the display screen the processor is configured to:
   define a longitudinal transition region bounded by a first longitudinal rotational boundary and a second longitudinal rotational boundary.

19. The apparatus of claim 18, wherein the processor is configured to:
   define a transverse transition region bounded by a first transverse rotational boundary and a second transverse rotational boundary.

20. The apparatus of claim 19, wherein to define the at least one transition region on the display screen the processor is configured to:
   define a transverse transition region bounded by a first transverse rotational boundary and a second transverse rotational boundary.

* * * * *